(12) United States Patent
Woelfel

(10) Patent No.: US 12,493,328 B1
(45) Date of Patent: Dec. 9, 2025

(54) PHONE CASE TO HOLD A CONCEALED DEFENSE SYSTEM

(71) Applicant: Michael B. Woelfel, Humble, TX (US)

(72) Inventor: Michael B. Woelfel, Humble, TX (US)

( * ) Notice: Subject to any disclaimer, the term of this patent is extended or adjusted under 35 U.S.C. 154(b) by 0 days.

(21) Appl. No.: 19/070,251

(22) Filed: Mar. 4, 2025

Related U.S. Application Data

(63) Continuation of application No. 18/809,502, filed on Aug. 20, 2024, now abandoned, which is a continuation of application No. 18/650,015, filed on Apr. 29, 2024, now abandoned.

(60) Provisional application No. 63/536,765, filed on Sep. 6, 2023.

(51) Int. Cl.
*G06F 1/16* (2006.01)
*F41B 9/00* (2006.01)
*F41H 9/10* (2006.01)

(52) U.S. Cl.
CPC .......... *G06F 1/1656* (2013.01); *F41B 9/0084* (2013.01); *F41H 9/10* (2013.01); *G06F 1/1629* (2025.01)

(58) Field of Classification Search
CPC .... G06F 1/1629; G06F 1/1656; F41B 9/0062; F41B 9/0084; F41B 9/0087; F41H 11/00
See application file for complete search history.

(56) References Cited

U.S. PATENT DOCUMENTS

| | | | |
|---|---|---|---|
| 8,934,213 B2* | 1/2015 | Froom | F41H 13/0018 361/232 |
| 10,634,460 B1* | 4/2020 | Sheikh | F41H 9/10 |
| 11,957,281 B1* | 4/2024 | Keegan | A47K 10/42 |
| 2003/0050088 A1* | 3/2003 | Kroll | H04M 17/005 455/550.1 |
| 2013/0092565 A1* | 4/2013 | Swope | F41H 13/0018 206/216 |
| 2019/0310049 A1* | 10/2019 | Stilson | F41B 9/0071 |

* cited by examiner

*Primary Examiner* — Anthony Q Edwards
(74) *Attorney, Agent, or Firm* — Richard Eldredge; Leavitt Eldredge Law Firm

(57) ABSTRACT

A cell phone case to hold a concealed defense system, comprising, a concealed defense system, a cell phone case, and an attachable means to removably attach the concealed defense system to the back of the cell phone case to form a flat foot that stabilizes and directs the defense system toward the danger or a target. The concealed defense system can be a flat mini pepper spray canister or a flat defense projectile device.

2 Claims, 7 Drawing Sheets

PHONE CASE TO HOLD A CONCEALED DEFENSE SYSTEM

BACKGROUND

1. Field of the Invention

The present invention relates generally to defense systems, and more specifically to a phone case to hold a concealed defense system.

2. Description of Related Art

Pepper spray is an extremely effective defensive tool. In the law enforcement world, it's proven to be 85-90% effective in arrest scenarios to reduce resistance, the whole point of pepper spray as a self-defense tool is to avoid being in close contact with the attacker. There is always a need to carry pepper spray safely in a concealed manner as a personal defense system.

A handgun is a firearm designed to be small enough to be held in one hand when fired and usable with only one hand. It is distinguished from a long gun (i.e., rifle, shotgun, submachine gun, or machine gun) which needs to be held by both hands and braced against the shoulder. Handguns are widely available to civilians and commonly carried for self-defense.

Accordingly, although great strides have been made in the area of the phone case to hold concealed defense systems, many shortcomings remain.

DESCRIPTION OF THE DRAWINGS

The appended claims set forth the novel features believed characteristic of the embodiments of the present application. However, the embodiments themselves, as well as a preferred mode of use, and further objectives and advantages thereof, will best be understood by reference to the following detailed description when read in conjunction with the accompanying drawings, wherein:

Figure 1:
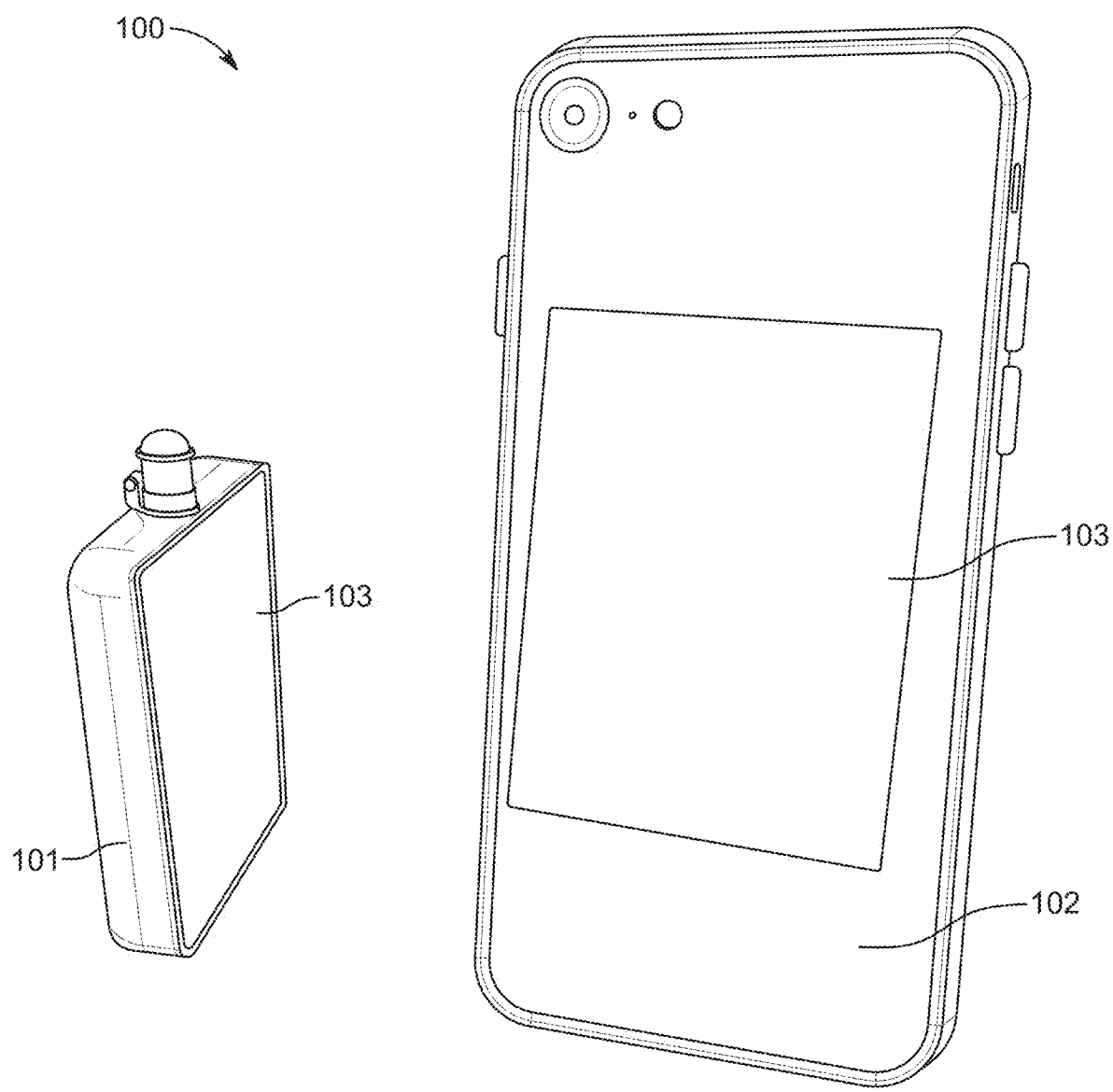
FIG. 1 is a phone case to hold a concealed defense system of the present invention with a pepper spray canister in a detached configuration.
Figure 2:
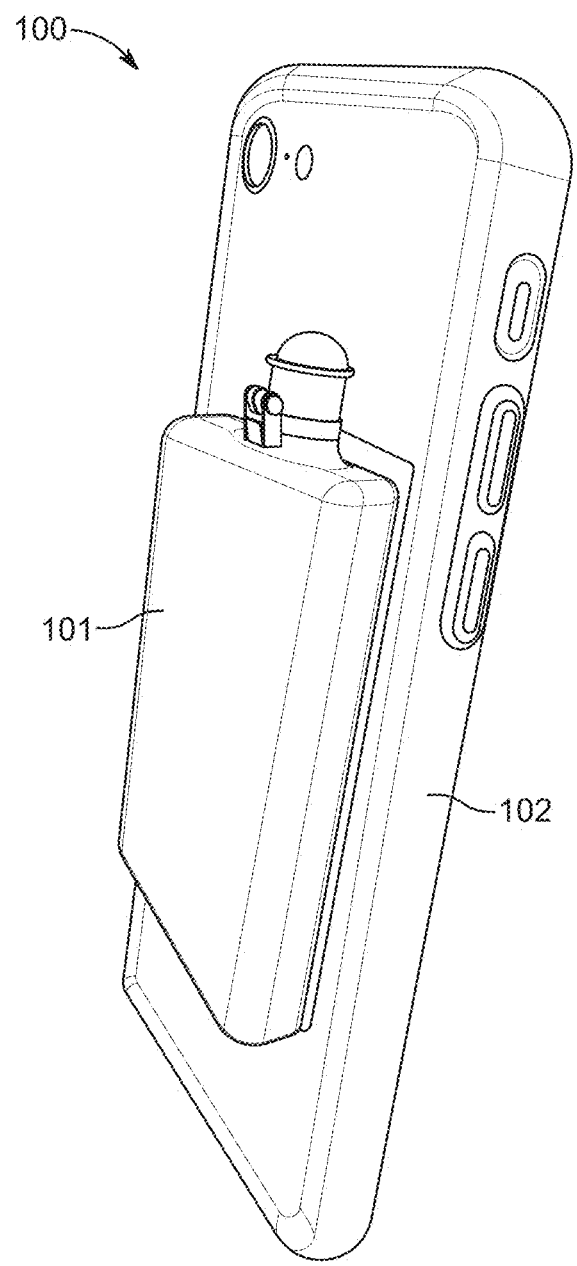
FIG. 2 is a phone case to hold a concealed defense system of FIG. 1 with a pepper spray canister in an attached configuration.
Figure 3:
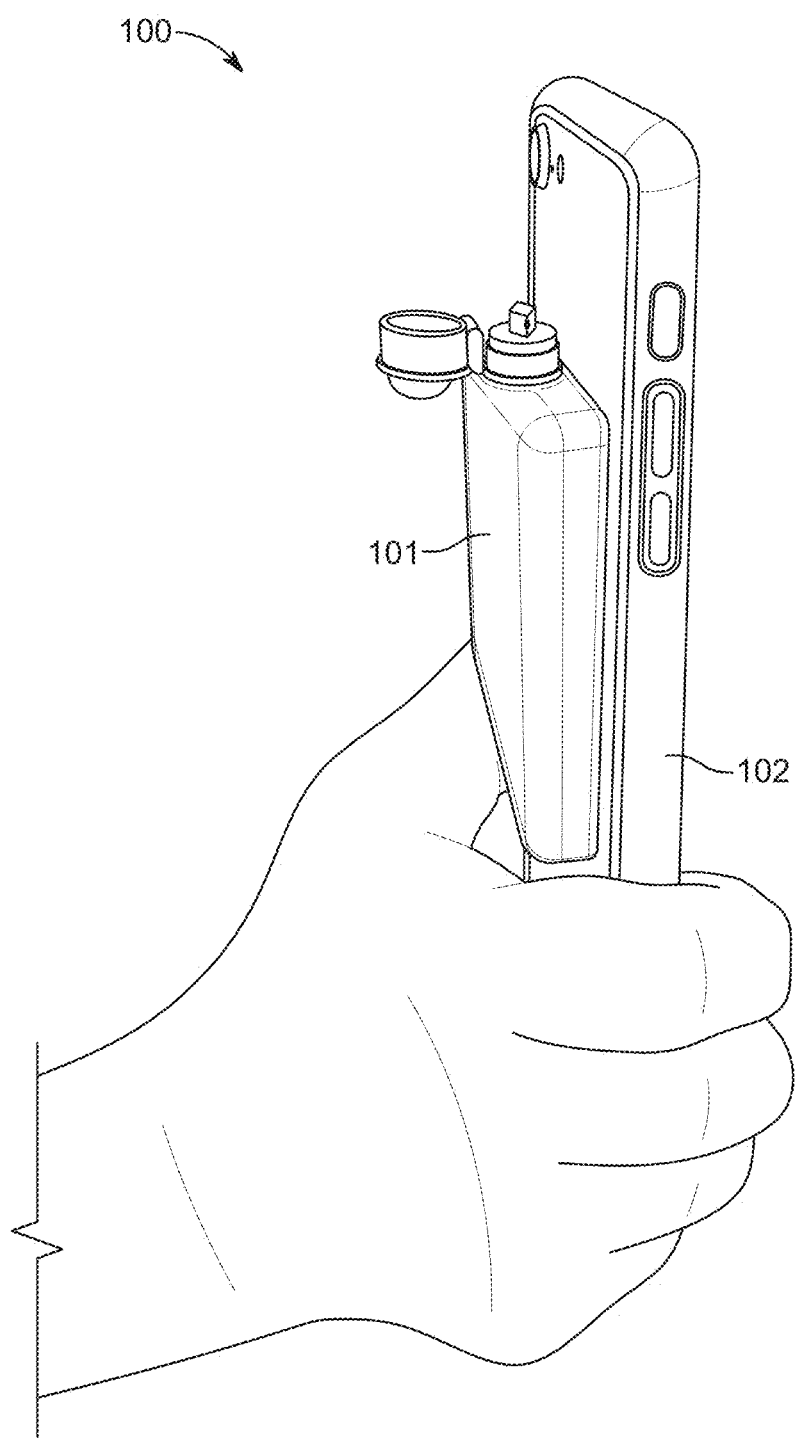
FIG. 3 is a phone case to hold a concealed defense system of FIG. 1 with an open safety cap.
Figure 4:
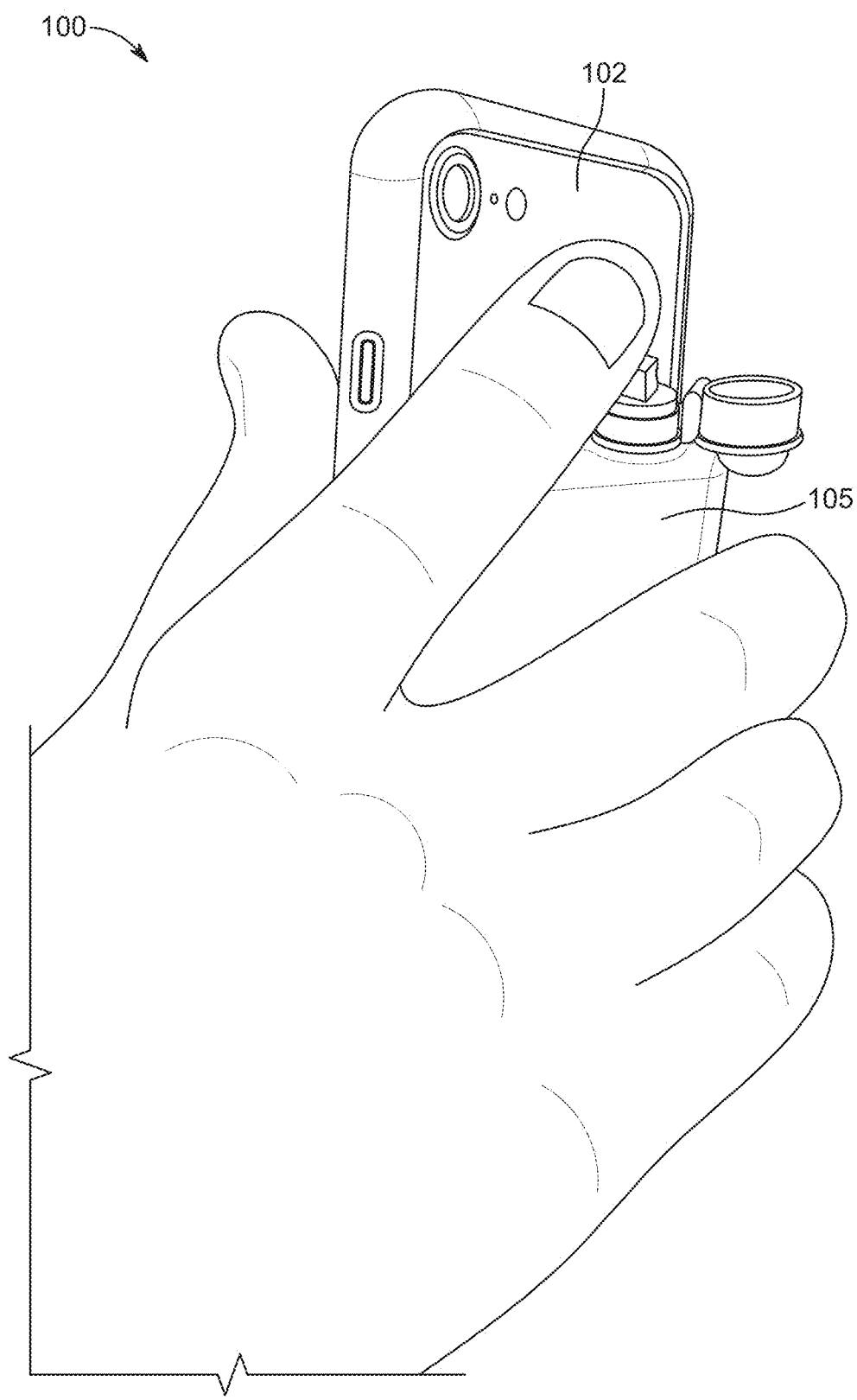
FIG. 4 is a phone case to hold a concealed defense system of FIG. 1 ready to use.

While the phone case to hold a concealed defense system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the phone case to hold a concealed defense system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The phone case to hold a concealed defense system and method of use will be understood, both as to its structure and operation, from the accompanying drawings, taken in conjunction with the accompanying description. Several embodiments of the device are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments are expressly contemplated herein so that one of ordinary skill in the art would appreciate from this disclosure that the features, elements, and/or functions of one embodiment may be incorporated into another embodiment as appropriate unless described otherwise.

The defense projectile device described herein embodies all kinds of handguns or firearms designed to be small enough to be held in one hand when fired and usable with only one hand.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein reference characters identify corresponding or similar elements throughout the several views, FIGS. 1-7 depict a phone case to hold a concealed defense system in accordance with a preferred embodiment of the present application. It will be appreciated that a phone case to hold a concealed defense system 100 overcomes one or more of the above-listed problems commonly associated with a conventional phone case to hold a concealed defense system. In addition, it should be appreciated that more or fewer such components may be included in different embodiments of the phone case to hold a concealed defense system 100.

According to the preferred embodiment, the phone case to hold a concealed defense system 100 of the present invention comprises a concealed defense system 101 may be removably attached to the back of the cell phone case 102 with an attachable means 103 with the use of a hardened material molded against the concealed defense system 101 to form a flat foot that will stabilize and direct the defense system (spray from a pepper spray canister or shots from a defense projectile device) 101 toward the danger when affixed against the back of the cell phone case 102.

The concealed defense system 101 can be a mini pepper spray canister or a defense projectile device according to the preferred embodiment of the present invention.

In the contemplated embodiment, the attachable means 103 includes but is not limited to 'velcro' or 'dual lock' or any other suitable means, with one side of the interlocking means attached to the back of the phone case 102 and the second side of the interlocking means attached to the flat side of the concealed defense system 101 so that the concealed defense system 101 can be temporarily attached to the back of the phone case 102.

In the contemplated embodiment, the phone case to hold a concealed defense system 100, can be used like a normal phone case without attaching the concealed defense system 101 and can be used to safely hide or conceal the defense system (pepper spray canister or pepper spray container or defense projectile device) when in need.

Figure 5:
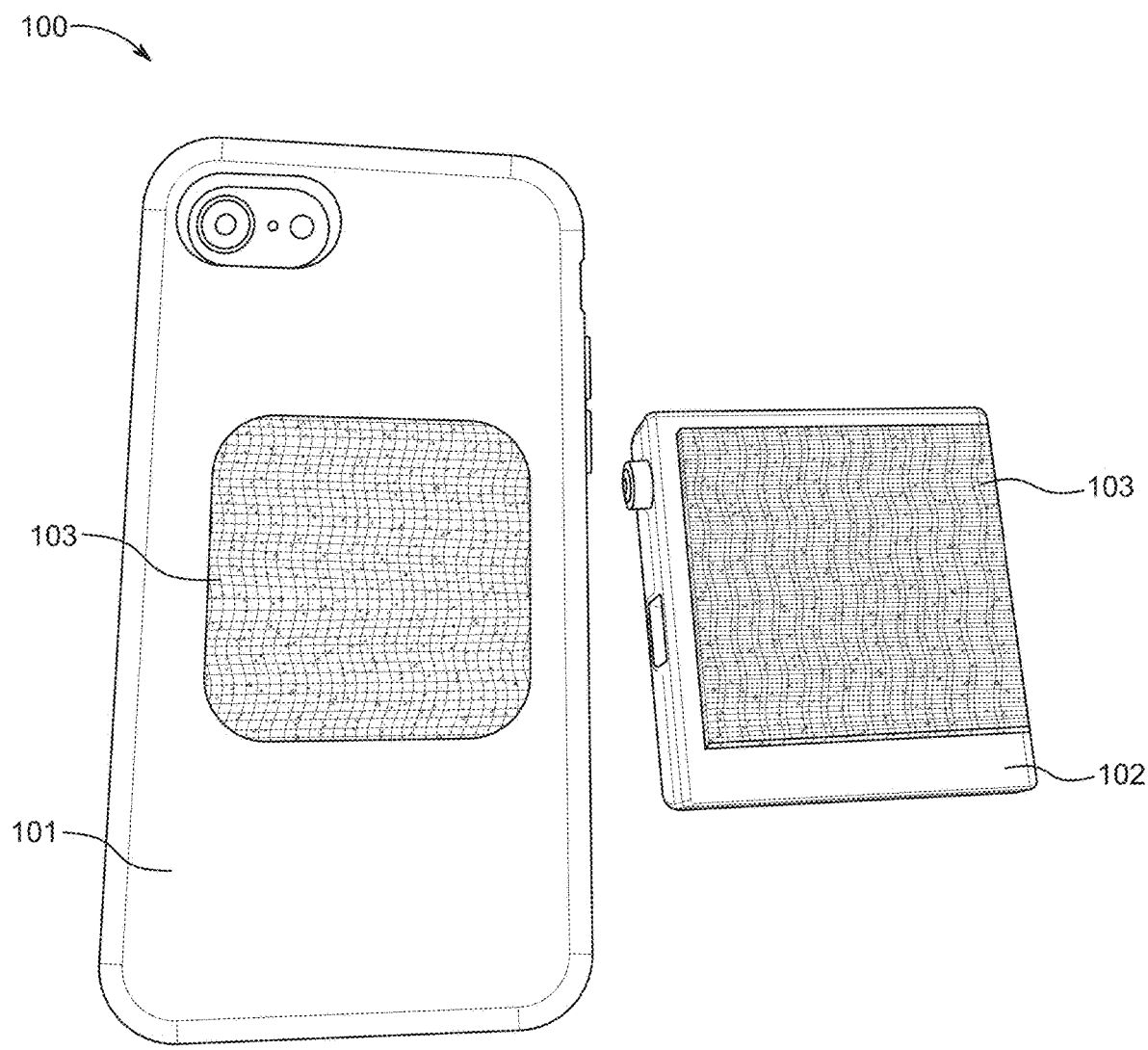
FIG. 5 is a phone case to hold a concealed defense system of the present invention with a defense projectile device in a detached configuration.
Figure 6:
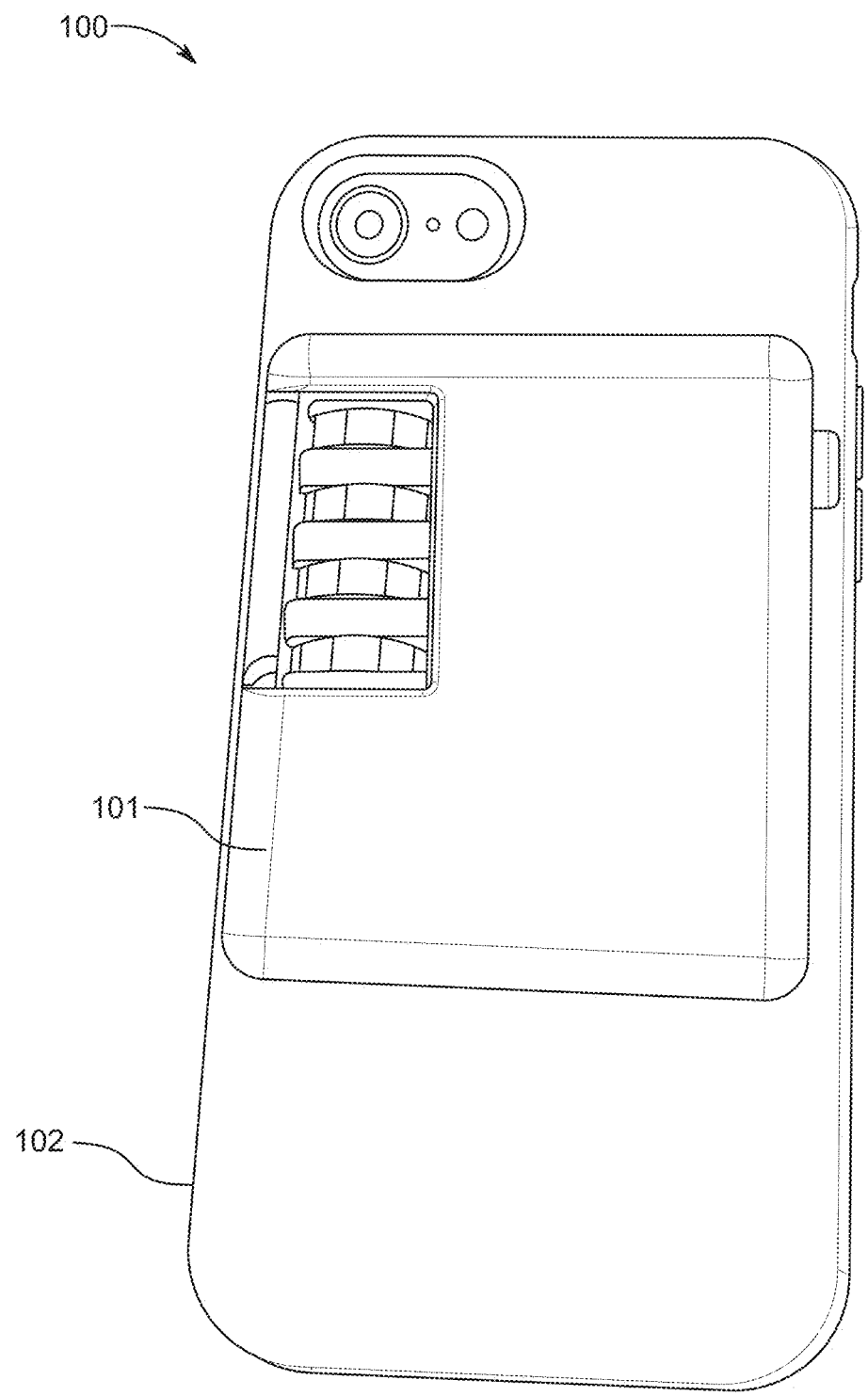
FIG. 6 is a phone case to hold a concealed defense system of FIG. 5 with a defense projectile device in an attached configuration.
Figure 7:
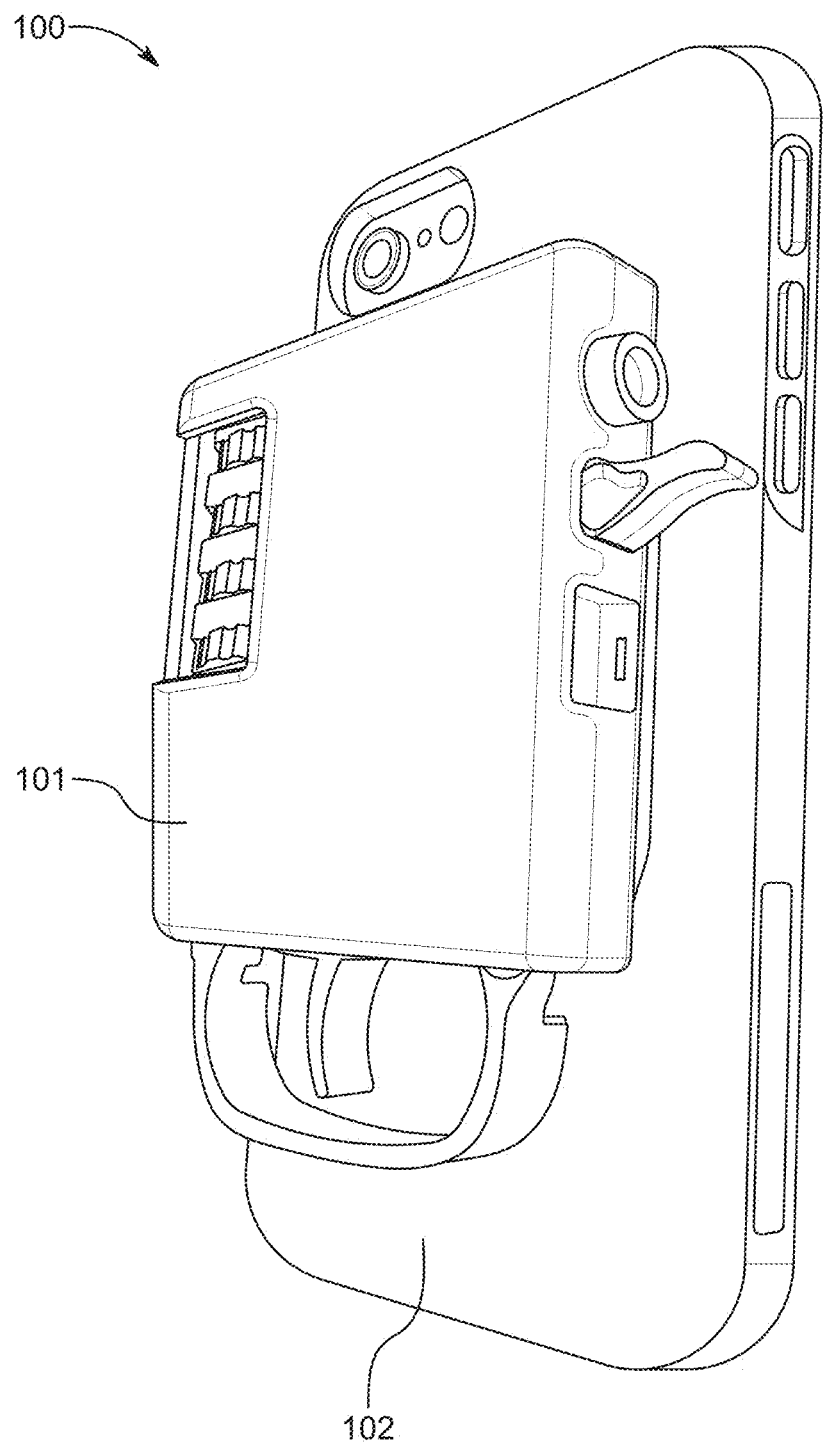
FIG. 7 is a phone case to hold a concealed defense system of FIG. 5 with a defense projectile device showing a trigger and a finger protector.

In the contemplated alternative embodiment, as shown in FIGS. 5-7, the phone case to hold a concealed defense system 100 of the present invention includes a concealed defense system 101 which may be a defense projectile device comprising a short barrel and an operating unit for safety. The operating unit can be a lock that can be opened using a key or a dial lock or a padlock which when activated can release a trigger from the bottom of the concealed defense system and juts out a finger protector from the side of the concealed defense system and below the short barrel, which protects the fingers while shooting. The trigger when pulled back, can release shots from the short barrel located on the side of the concealed defense system, directed at any target towards which the concealed defense system is aimed at. The operating unit in a locked position keeps the finger protector withdrawn and avoids any unintentional or accidental shooting event. The concealed defense system can be a handgun in the shape of a flat rectangular box or a cuboid. The concealed defense system of the present embodiment can be removably attached to the phone case using a dual-lock or a velcro adhesive. The phone case to hold a concealed defense system 100 of the present invention can be carried casually without exposing the defense system and is portable and compact for carrying in a purse or bag or pocket of the clothing article, or a glove compartment.

In the contemplated embodiment, the concealed defense system 101 may be completely hidden under an overhanging flap 105 made of fabric or a form-fitted plastic cover or other material.

The cover of the activated upper spray nozzle of the pepper spray canister may be folded back or slid back to expose the spray end of the pepper canister for personal defense and to direct the spray toward the danger.

In the contemplated embodiment, the phone case to hold a concealed defense system 100 of the present invention, preferably the pepper spray canister may have a removable extra security cap supplied as part of a consumer phone pepper defense kit for additional safety to cover tightly over the upper portion of a currently marketed capped, swing-lever, twistable or lift-lid type pepper spray cylinder to prevent a canister from accidentally spraying when affixed to the phone, while in a purse, a glove-box, or by a small child, etc. This secondary flexible safety cap may be made of silicone rubber or other form-fitting material that may be instantly removed from the spray end before or in a defending moment.

In the contemplated embodiment, the phone case to hold a concealed defense system 100 of the present invention, the pepper spray container can preferably be made in a rectangular shape or any other flat shape and attached to the back of the phone to appear as a flat rectangular backup battery instead of retrofitting a bulky cylindrical shaped spray canister, the pepper spray container.

In the contemplated embodiment, the phone case to hold a concealed defense system 100 of the present invention, the flat pepper spray container may be attached permanently, and be offered with an optional empty component of peel-n-stick 'velcro', 'dual Lock' or another detachable equivalent, given to alternately hold a user's chosen cell phone attachment, such as one of the many pop sockets, ring holders, hand loops, or phone stands, etc., available in the market. This option can allow for either interchanging with the pepper container or being added or stacked atop the flat pepper container on the phone. The stacked configuration would add bulk to a slender phone making it more easily handled and aimed.

As shown in FIGS. 1-4, the phone case to hold a concealed defense system 100 of the present invention can be operated in an attached configuration and a detached configuration with concealed defense system temporarily and removably attached to the phone case as and when needed. The phone case to hold a concealed defense system 100 is better than a cumbersome permanently mounted concealed defense system, this allows the cell phone to remain either empty, without an attachment, or have it with a person's preferred daily favored pop socket, ring loop, hand loop, kickstand, etc. Then, when entering a dark parking lot, on a blind date, or anywhere one might feel vulnerable, the option is available to quickly attach this covert defense spray and continue, phone in hand and ready.

In the contemplated embodiment, the phone case to hold a concealed defense system 100 of the present invention includes a concealed defense system which may be a flat spray container and that may have a swing arm safety lever operable only when uncovered, to prevent an unintended spray event, and also be of a design to facilitate instant readiness in a confrontation, and/or such swing arm may also have a secondary safety cover of a flexible material such as silicone to remain over the swing arm and spray portion, for the avoidance of an unintended spray incident. The spray container can be a pepper spray container.

The phone case to hold a concealed defense system 100 of the present invention can enable any individual to surprise and dominate against a personal attack with salient power hidden in hand behind the phone, to stop instantly an aggressive human or animal, and simply walk away.

Additional elements of the present invention, focus on various structural options of the preferable concealed defense system with a flat rectangular pepper canister or a defense projectile device. Several variations are contemplated, one with the aforementioned swing-lever safety or safety operating unit that can enable the end consumer to attach the concealed defense system to a cell phone case for left-hand use or to position it for the right-handed.

It should be appreciated that the phone case to hold a concealed defense system 100 of the present invention can be interchangeably attached to the pepper spray containers when out of spray and replace with a new one. It provides hidden in-hand, autonomous, hard-hitting, nonlethal ergonomic quick defense means to surprise and stop the attacker or danger at any location, any time, and can be used by persons of any age group, women or men alike. It helps in hiding away the pepper spray container from out of sight of the attacker and will stay hidden and remain undetected. It is economical, easy to manufacture, and convenient to use.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments but are amenable to various changes and modifications without departing from the spirit thereof.

What is claimed:

1. A cell phone case to hold a concealed defense system, comprising:
    the concealed defense system;
    the cell phone case; and
    an attachable means;
    wherein the concealed defense system is removably attached to a back of the cell phone case using the attachable means to form a flat foot that stabilizes and directs the defense system toward danger or a target;
    wherein the concealed defense system is a flat defense projectile device comprising a barrel and a safety operating unit which when unlocked and activated releases a trigger on a bottom of the concealed defense system and juts out a finger protector on a side of the concealed defense system and below the barrel; and
    wherein the defense projectile device fires shots from the barrel when the trigger is pulled back and directed towards the danger or target.

2. A cell phone case to hold a concealed defense system of claim 1, wherein the defense projectile device can be a handgun.

* * * * *